United States Patent [19]
Swart et al.

[11] Patent Number: 6,016,884
[45] Date of Patent: Jan. 25, 2000

[54] CONFIGURATION FOR TRIGGERING A PERSONAL PROTECTION SYSTEM

[75] Inventors: Marten Swart, Obertraubling; Gerhard Mader, Thalmassing, both of Germany

[73] Assignee: Siemens Aktiengesellschaft, Munich, Germany

[21] Appl. No.: 08/949,652

[22] Filed: Oct. 14, 1997

Related U.S. Application Data

[63] Continuation of application No. PCT/DE96/00599, Apr. 4, 1996, abandoned.

[51] Int. Cl.$^7$ .......................... B60R 21/00; B60R 21/32
[52] U.S. Cl. ........................ 180/282; 280/735; 307/10.1
[58] Field of Search ..................... 280/735; 180/282; 701/45; 307/10.1; 340/436, 438

[56] References Cited

U.S. PATENT DOCUMENTS

| | | |
|---|---|---|
| 5,085,464 | 2/1992 | Behr et al. . |
| 5,187,465 | 2/1993 | Stonerook et al. ...................... 280/735 |
| 5,261,694 | 11/1993 | White et al. ............................ 280/735 |
| 5,612,623 | 3/1997 | Watanabe et al. ...................... 340/436 |

FOREIGN PATENT DOCUMENTS

| | | |
|---|---|---|
| 0011680A1 | 6/1980 | European Pat. Off. . |
| 0396265A2 | 11/1990 | European Pat. Off. . |
| 0410108A1 | 1/1991 | European Pat. Off. . |
| 0518501A1 | 12/1992 | European Pat. Off. . |
| 0567938A1 | 11/1993 | European Pat. Off. . |
| 3805161A1 | 8/1989 | Germany . |
| 9001803 | 6/1990 | Germany . |
| 4209140 A1 | 9/1992 | Germany . |
| 89/09147 | 10/1989 | WIPO . |

*Primary Examiner*—Peter C. English
*Attorney, Agent, or Firm*—Herbert L. Lerner; Laurence A. Greenberg

[57] ABSTRACT

A configuration for triggering a personal protection system supplies a trigger signal for triggering the personal protection system which is dependent on an acceleration-dependent release signal and a response of a switch that operates acceleration-dependently, in a protection device or safing sensor. A simple and testable structure for such a protection device includes two switching units which can be alternately connected through and locked for testing purposes.

9 Claims, 3 Drawing Sheets

CONFIGURATION FOR TRIGGERING A PERSONAL PROTECTION SYSTEM

CROSS-REFERENCE TO RELATED APPLICATION

This application is a continuation of International Application Ser. No. PCT/DE96/00599, filed Apr. 4, 1996, now abandoned.

BACKGROUND OF THE INVENTION

Field of the Invention

The invention relates to a configuration for triggering a personal protection system with a trigger signal as a function of a response signal and a release signal, including an acceleration sensor supplying the response signal, a control unit supplying the release signal, a protection device having two switching units each with a fixed electrode and a switching arm interacting with the latter for supplying a closing signal as a function of acceleration, the protection device outputting the trigger signal as soon as both switching units close simultaneously, and a test device associated with the switching units for adjusting the switching arm of each switching unit to a response position as a function of an assigned electrical test signal.

A "personal protection system" is understood herein to be, for example, an airbag system and/or a seat belt pretensioning device.

In order to protect against misfirings of such personal protection systems, it is customary to not only make the triggering dependent on the response signal of an acceleration sensor, but in addition, a release signal of a protection device is necessary. The device is usually a mechanical switch (safing sensor) that operates acceleration-dependently. For example, German Utility Model G 90 01 803.6 U1 discloses a configuration with two mechanical crash sensors as a protection device and an electronic acceleration sensor. In order to carry out a functional test, each sensor is disconnected from the rest of the circuit through the use of controllable switching transistors, something which requires a large degree of outlay for a control device and a switching device.

U.S. Pat. No. 5,085,464 proposes a mechanical switch which operates acceleration-dependently and in which a soft-magnetic seismic mass is connected to a switching arm of the switch. The seismic mass is surrounded by a coil. When current flows through the coil, the switch is held in the open or closed state by the magnetic force acting on the seismic mass, depending on the direction of the flow of current in the coil. However, such a switch which operates acceleration-dependently has not been adopted in practice due to its complex structure and due to its large electromagnetic radiation, which may in turn act on an electronic acceleration sensor of a personal protection system.

German Published, Non-Prosecuted Patent Application DE 38 05 161 A1, corresponding to U.S. Pat. No. 4,991,682, discloses an acceleration sensor device having a plurality of switches which operate acceleration-dependently and have a different response threshold. The individual switches are disposed on a common substrate in that device.

SUMMARY OF THE INVENTION

It is accordingly an object of the invention to provide a configuration for triggering a personal protection system, which overcomes the hereinafore-mentioned disadvantages of the heretofore-known devices of this general type, which has a simple construction, which can be tested even after installation in a vehicle and during the testing of which misfiring of the personal protection system is prevented.

With the foregoing and other objects in view there is provided, in accordance with the invention, a configuration for triggering a personal protection system, comprising an acceleration sensor for supplying a response signal; a control unit for receiving the response signal and supplying a release signal; and a protection device receiving the release signal and having a test device supplying an electrical test signal and two switching units receiving the test signal and supplying a closing signal as a function of acceleration; each of the switching units having a fixed electrode, a switching arm interacting with the fixed electrode, a test input and a lock-out input; the test input and the lock-out input of the switching units coupled to one another for locking out one of the switching units upon application of the test signal to the other of the switching units; the switching arms adjusting to a response position in dependence on the test signal; and the protection device outputting a trigger signal to a personal protection system as a function of the response signal and the release signal as soon as both of the switching units close simultaneously during a minimum interval. Therefore, each switching unit has a locking device through which each switching unit can be locked in an open state as a function of an electrical lock-out signal.

In accordance with another feature of the invention, the test input of each of the switching units is connected to the lock-out input of the other of the switching units and both of the switching units are driven with the same test signal.

In accordance with a further feature of the invention, each of the switching units is a micromechanical structure.

In accordance with an added feature of the invention, each of the switching units has a test electrode connected to the test input, and each of the switching arms is adjusted to the response position by applying the test signal to the test input.

In accordance with an additional feature of the invention, the switching arms each have a given side disposed opposite the test electrode, and each of the switching units has a lock-out electrode disposed at the given side and connected to the lock-out input.

In accordance with yet another feature of the invention, both of the switching units are disposed on the same substrate, and the test input of each of the switching units is connected to the lock-out electrode of the other of the switching units.

In accordance with yet a further feature of the invention, the acceleration sensor is a micromechanical structure on the substrate.

In accordance with yet an added feature of the invention, there is provided an evaluator logically connecting the closing signals of the switching units and containing a device for prolonging the trigger signal to a minimum value.

In accordance with a concomitant feature of the invention, the evaluator has circuit points at which the signals to be logically connected occur, a neutral point, isolating resistors connected between the circuit points and the neutral point, an output for the trigger signal, an RC element connected between the output for the trigger signal and the neutral point, a transistor connected between the output for the trigger signal and earth, and an operational amplifier with hysteresis forcibly tripping the transistor if a potential at the neutral point drops below a reference value.

In the simplest case, the aforesaid closing condition (AND condition) can be monitored or interrogated by connecting the switching units in series or by appropriately logically connecting closing signals which are derived from the switching units. The switching units can be tested. Furthermore, a locking device is provided, by which the respectively nontested switching unit can be locked for the other switching unit through the use of the test signal. As a result, it becomes possible to test each of the switching units without the risk of misfiring of the personal protection system by closing one of the switching units in each case.

Preferably, the switching units are realized as micromechanical structures, such as are described in Published European patent Application 0 567 938 A1 for example. In this context, it is particularly expedient to place both switching units on the same substrate, which can also contain the acceleration sensor.

Other features which are considered as characteristic for the invention are set forth in the appended claims.

Although the invention is illustrated and described herein as embodied in a configuration for triggering a personal protection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
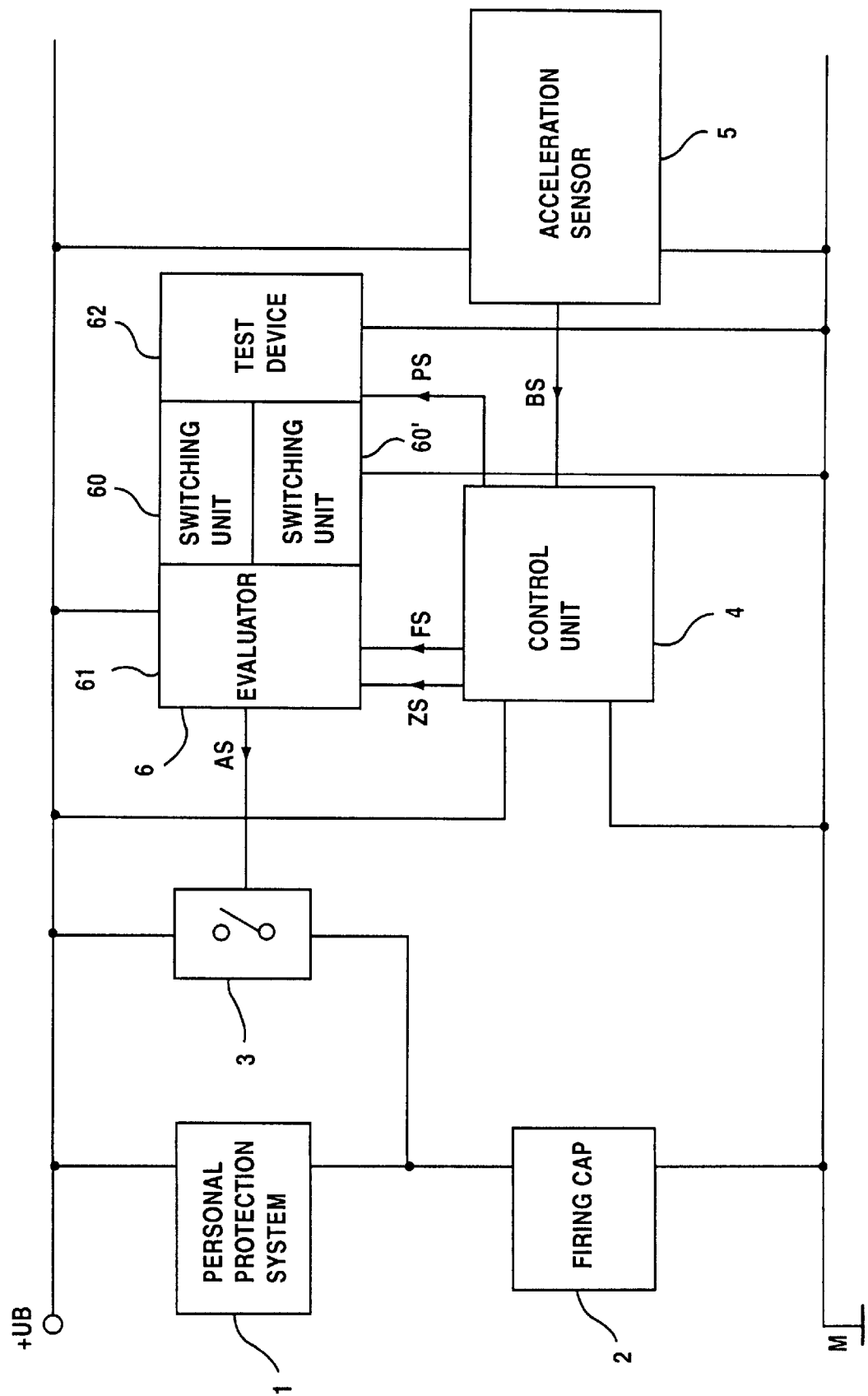
FIG. 1 is a block diagram of a configuration for triggering a personal protection system.

Referring now to the figures of the drawings in detail and first, particularly, to FIG. 1 thereof, there is seen a personal protection system 1 which is connected in series with a firing cap 2 between terminals UB and M of a voltage source.

The firing cap is also connected to the terminals through a trigger switch 3 which can be driven by a trigger signal AS of a protection device 6. If this trigger switch 3 is closed by the trigger signal AS, the firing cap 2 "connects" through and thus triggers the personal protection system 1.

The triggering is dependent on a response signal BS of an acceleration sensor 5, that is evaluated in a control unit 4 which as a rule is a microprocessor. When appropriate, the control unit 4 supplies a release signal FS to an evaluator 61 in the protection device 6. The protection device 6 contains two switching units 60, 60' each of which outputs a closing signal if the acceleration exceeds a limit value. These closing signals are sensed by the evaluator 61, which outputs the trigger signal AS in the event of a minimum overlap of these closing signals and given the presence of the release signal FS.

In addition, the protection device 6 contains a test device 62 through the use of which the two switching units 60, 60' can be tested alternately as a function of a test signal PS of the control unit 4.

Figure 2:
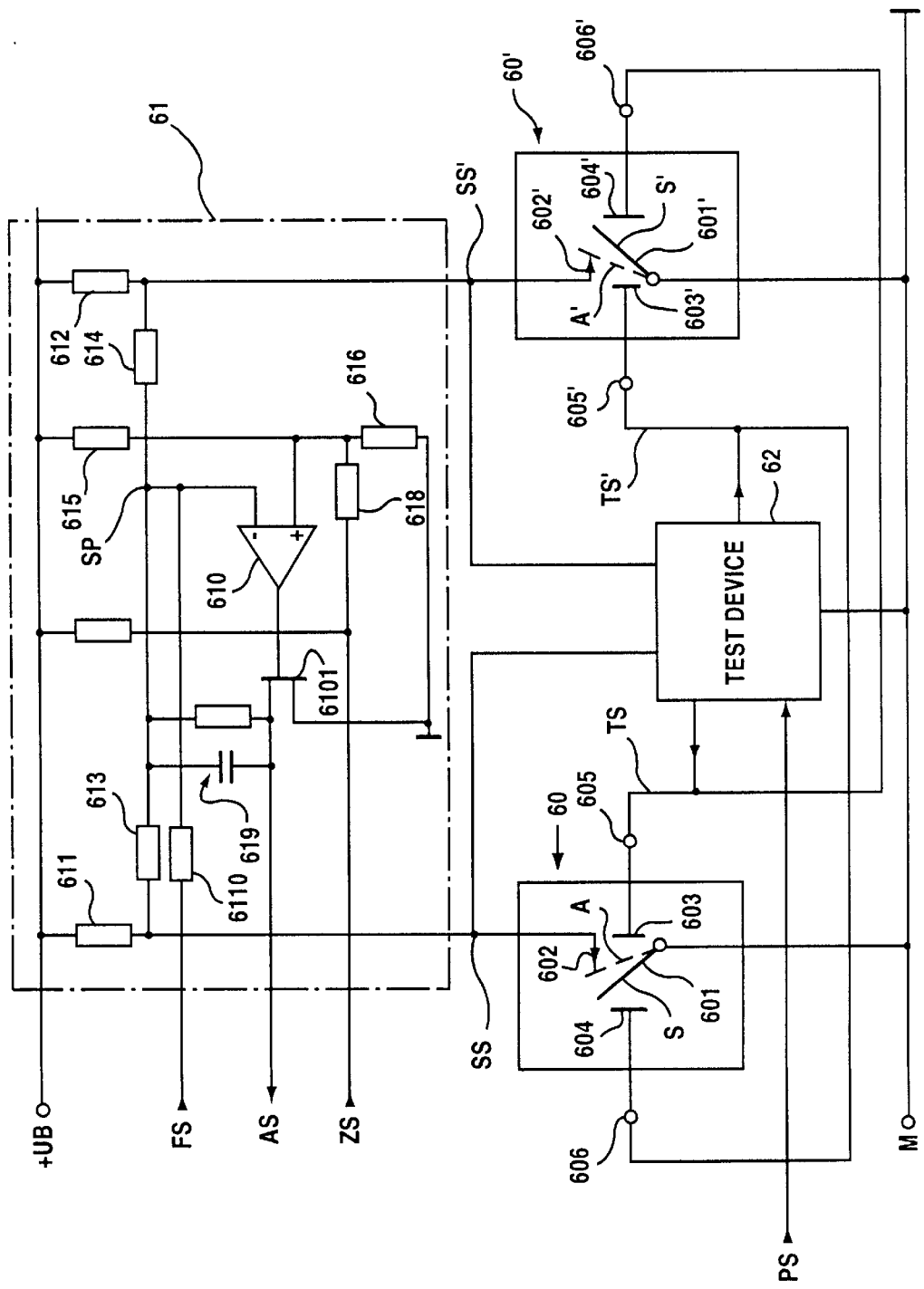
FIG. 2 is a schematic and block diagram of an exemplary embodiment of the protection device.

FIG. 2 shows the protection device 6 in which the micromechanical switching units 60, 60' are illustrated schematically. According to that figure, each switching unit contains a switching arm 601, 601' which interacts with a fixed or solid electrode 602, 602' and can be moved from a lock-out position S, S' into a response position A, A' shown by broken lines. A test electrode 603, 603' on one side of the switching arm and a lock-out electrode 604, 604' on an opposite side of the switching arm are used for this purpose. Each test electrode is connected to an associated test input 605, 605' and each lock-out electrode is connected to an associated lock-out input 606, 606'. If a test signal TS, TS' is applied between a test input 605, 605' and earth or ground M, the switching arm 601, 601' is drawn into the response position A by a resulting electrical field, and a closing signal SS, SS' which then occurs is sensed by the test device or evaluator 62 in the protection device 6 and evaluated.

According to FIG. 2, the test input 605 of the switching device 60 is connected to the lock-out input 606' of the switching device 60' and the test input 605' of the switching device 60' is connected to the lock-out input 606 of the switching unit 60. Therefore, if the test signal TS is present at the test input 605 and moves the switching arm 601 of the switching unit 60 into the response position A, the switching arm 601' of the other switching unit 60' is simultaneously drawn into the lock-out position S' as shown, or held there. In this way, an incorrect, simultaneous response of the two switching units is precluded.

The evaluator 61 is essentially an AND gate which supplies the trigger signal AS as soon as all input conditions have been fulfilled, namely the closing signals SS, SS' are present at the same time as the release signal FS and an additional signal ZS from the control unit 4. For this purpose, the fixed electrodes 602, 602' are each connected through a respective resistor 611, 612 to the terminal UB and through a respective resistor 613, 614 to a neutral point SP which is connected through a further resistor 6110 to the control unit 4 that applies a low potential in this way as the release signal FS. However, the neutral point SP can assume the low potential only if both switching units 60, 60' are additionally closed. In this case, a potential at an inverting input of an operational amplifier 610 drops below a potential at a noninverting input, which is determined by a voltage divider 615, 616. As a result, an output of the operational amplifier 610 changes to high and a transistor 6101 is forcibly tripped, so that the trigger signal AS (earth potential) is output. The signal AS has a minimum duration, which is independent of the closing period of the switching units and which is determined by a time constant of an RC element 619 and hysteresis of the operational amplifier 610 that is determined by a resistor 618, as follows: As a result of charging a capacitor of the RC element 619, a minimum time passes after the opening of the two switching units until a switch-back threshold of the operational amplifier 610 is reached.

In this case, the additional signal ZS acts on the output of the operational amplifier 610 and permits the above-described function only if it has a high value. Triggering can then always be prevented through the use of a low value of the additional signal (for example if an error has been detected during a test).

In the previous description, mention was continuously made of a closing of the switching arms of the switching units. However, this terminology should also include an embodiment in which a "closing signal" is generated if the switching arm drops below a minimum distance from the fixed electrode. In such an embodiment, it is possible, for example, to monitor the change in the capacitance between the fixed electrode and the switching arm.

The switching units can be tested when the configuration is activated. However, the switching units can also be tested when the configuration is being operated, that is to say during driving. The testing mode can be interrupted so that, nevertheless, the personal protection system can be triggered in the event of an accident occurring during the testing mode. This takes place, for example, if the acceleration sensor detects acceleration which exceeds a threshold value, during the testing mode.

Figure 3:
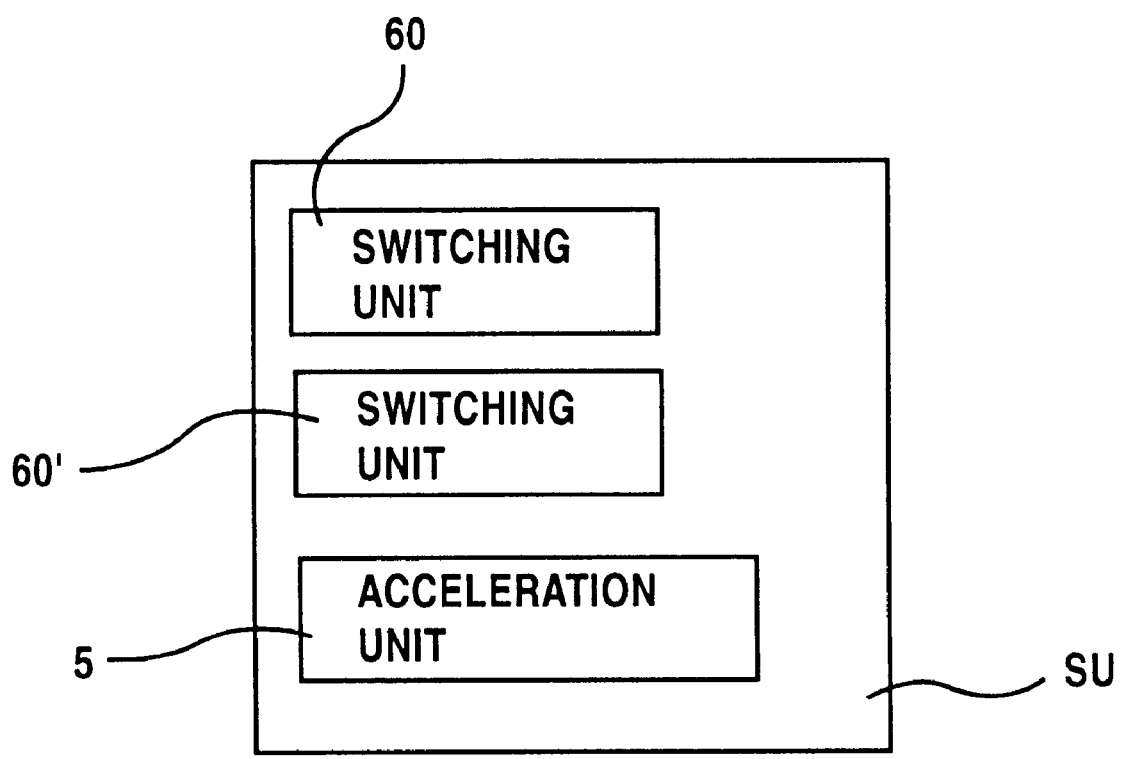
FIG. 3 schematically shows a substrate on which switching units and an acceleration sensor are arranged.

FIG. 3 shows a substrate SU on which the two switching units 60 and 60' are arranged as well as an acceleration sensor 5.

We claim:

1. A configuration for triggering a personal protection system, comprising:

an acceleration sensor for supplying a response signal;

a control unit for receiving the response signal and supplying a release signal;

a protection device receiving the release signal and having a test device supplying electrical test signals and two switching units receiving the test signals and supplying closing signals as a function of acceleration;

each of said switching units having a fixed electrode, a switching arm interacting with said fixed electrode, a test input and a lock-out input;

said test inputs and said lock-out inputs of said switching units coupled to one another for locking out one of said switching units upon application of the respective test signal to the other of said switching units;

said switching arms moving to a response position in dependence on the respective test signal; and said protection device outputting a trigger signal to a personal protection system as a function of the release signal and the closing signals when both of said switching units close simultaneously.

2. The configuration according to claim 1, wherein said test input of each of said switching units is connected to said lock-out input of the other of said switching units and both of said switching units are driven with the respective test signal.

3. The configuration according to claim 1, wherein each of said switching units is a micromechanical structure.

4. The configuration according to claim 3, wherein each of said switching units has a test electrode connected to the respective test input, and each of said switching arms is moved to said response position by applying the respective test signal to the respective test input.

5. The configuration according to claim 4, wherein said switching arms each have a given side disposed opposite the respective test electrode, and each of said switching units has a lock-out electrode disposed at the respective given side and connected to the respective lock-out input.

6. The configuration according to claim 5, wherein both of said switching units are disposed on the same substrate, and said test input of each of said switching units is connected to said lock-out electrode of the other of said switching units.

7. The configuration according to claim 6, wherein said acceleration sensor is a micromechanical structure on said substrate.

8. The configuration according to claim 1, including an evaluator logically connecting the closing signals of said switching units and containing a device for prolonging the trigger signal to a minimum value.

9. The configuration according to claim 8, wherein said evaluator has circuit points at which the signals to be logically connected occur, a neutral point, isolating resistors connected between said circuit points and said neutral point, an output for the trigger signal, an RC element connected between said output for the trigger signal and said neutral point, a transistor connected between said output for the trigger signal and earth, and an operational amplifier with hysteresis forcibly tripping said transistor if a potential at said neutral point drops below a reference value.

* * * * *

UNITED STATES PATENT AND TRADEMARK OFFICE
CERTIFICATE OF CORRECTION

PATENT NO : 6,016,884
DATED : January 25, 2000
INVENTOR(S) : Marten Swart et al.

It is certified that error appears in the above-identified patent and that said Letters Patent is hereby corrected as shown below:

Title page, insert the following:
Item [30] should read as follows:

Apr. 13, 1995   [DE]   Germany .......... 195 14 082.6

Signed and Sealed this

Twenty-fourth Day of October, 2000

Attest:

Q. TODD DICKINSON

*Attesting Officer*          *Director of Patents and Trademarks*